June 13, 1933.     M. FINGER     1,913,664
VALVE FOR TRUCK TIRES
Filed Oct. 3, 1929

Witnesses

Inventor
Matt Finger
by
Attorney

Patented June 13, 1933

1,913,664

UNITED STATES PATENT OFFICE

MATT FINGER, OF WILMINGTON, DELAWARE

VALVE FOR TRUCK TIRES

Application filed October 3, 1929. Serial No. 396,953.

My invention relates to valve mechanism particularly adapted to use with pneumatic tires used on large automobiles such as busses and trucks.

A purpose of my invention is to provide novel valve structure for the rapid filling of pneumatic tires with air.

A further purpose is to construct a valve whose seat is readily accessible for repairs.

A further purpose is to guide and house a valve to the inner tube of an automobile tire in an outwardly directed tubular cup mounted upon the outer end of the stem and to present the valve seat to the valve as the inner end of an inlet fitting including an inwardly directed cup flange externally threaded upon the first cup.

I have preferred to illustrate one general form only, with modifications among the various forms in which it may appear, selecting the structure shown primarily because of its suitability for illustrating the principles involved.

At the present time it is generally customary to employ a valve of the plunger type having a ring of rubber to engage against an annular seat in the interior of the valve stem. While quite satisfactory as a means of retaining air in the tire, this valve has offered difficulty from the standpoints of filling speed and accessibility.

Since the diameter of the valve stem is necessarily limited by the requirement that it shall pass through the felloe of the wheel, the plunger type valve has been very small and the air inlet opening has been correspondingly restricted, so that very considerable time is required to fill the tire with air, particularly in the case of large trucks and busses where the tire is large and the pressure maintained is considerable. This makes but little difference for a single tire or for a single bus but in the aggregate, for bus stations or terminals, becomes a serious item.

If any foreign material becomes attached to the valve seat it has been difficult to clear this seat because of the inaccessible position in which the seat is necessarily placed in a plunger type valve.

By my invention I do not use a valve placed in the stem, but mount an entirely separate valve mechanism outside the stem, where it can be readily removed from the stem, and where the available space permits the use of a valve opening of adequate size. My valve is so constructed that, when once removed from the stem, it may readily be taken apart and inspected with the parts placed in their normal working relationship, so that the presence of any foreign material, or any defect in the fit of the parts will be apparent at once.

Figure 5:
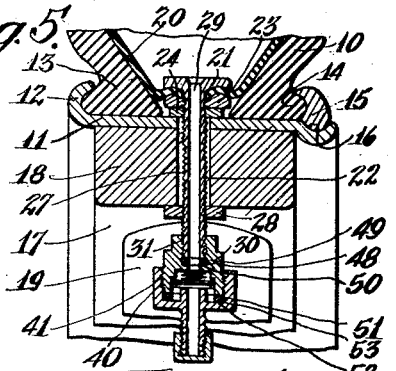
Figure 5 is a reduced scale sectional view showing the valve structure of Figure 1 modified in minor detail and also showing a normal setting of the valve structure embodying the invention.

In Figure 5 I show a tire 10 of a form commonly seen on automobiles and trucks, mounted on a rim 11. The rim is provided with a flange 12 which engages one side 13 of the base of the tire, the other side 14 of the base of the tire being held in position by a removable strip 15 extending around the rim and fitting into the recess 16 of the rim. I intend the form of rim shown to be entirely conventional, since my invention may be applied with any suitable type of rim, wheel, or tire.

The rim is shown in place on the wheel 17, consisting of a felloe 18 and a spoke 19.

The inner tube, seen at 20 is fastened to the valve stem 22 in any suitable way such as by gripping it between the disc 21 and the guard 23 when the nut 24 is tightened.

The valve stem is held firmly in place and is prevented from rubbing against the sides of the hole 27 in the felloe 18 by the nut 28. The walls of the interior opening 29 of the valve stem are not threaded as in the valve now commonly in use.

My valve is located in a two-piece housing screwed to the end of the valve stem. This permits the use of large valve ports without interfering with passage of the smaller valve stem through the felloe.

Figure 1:
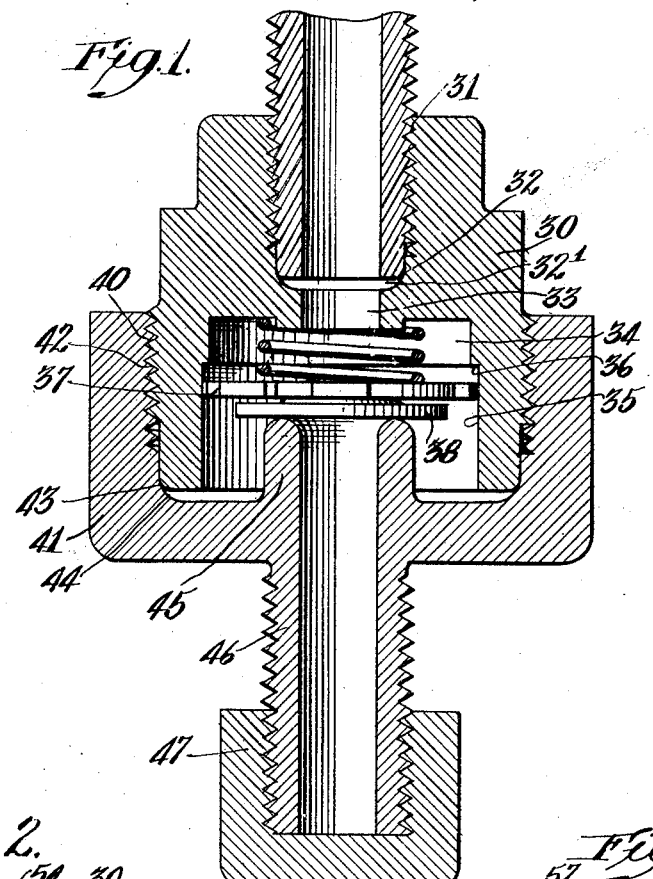
Figure 1 is a fragmentary section of mechanism embodying a desirable form of my invention.

The housing consists of a rearwardly directed cup 30 having a forwardly directed threaded opening 31 at its bottom or forwardly directed end adapted to screw on to the inlet end of the valve stem and to make either a metal to metal or a packed joint with it. In Figure 1 the tapered seat at the shoulder 32 of the counterbore 32' forms a tight metal to metal seal with the tapered end of the valve stem.

Rearwardly beyond the threaded opening 31 the interior bore of the cup may be for a short distance as at 33 substantially that of the interior of the valve stem. On the rearward side of this the interior is greatly enlarged to form a counterbore 34 and a bore 35 providing a shoulder 36.

The disc 37 is of but slightly smaller diameter than the bore 35 so that it may rest against the shoulder 36, but have adequate clearance from it. To the face of the notched disc 37 is attached a rubber valve 38. In Figure 1 this attachment is made by a solid headed cupped rivet 39.

The cup 30 is externally threaded along its largest circumference at 40 to receive a valve seat support 41 internally threaded at 42. The end of the cup 30 is tapered in Figure 1 at 43 to make a close metal to metal fit with the fillet 44 in the interior of the support 41.

The annular valve seat 45 is carried by the support 41, so as to lie close to the valve 38 and yet to give sufficient clearance after the support has been tightly screwed down to place for air to be inserted freely through the valve seat when the disc 37 is pressed against the shoulder 36. The tubular extension 46 from the valve seat support is shown as externally threaded to receive the internally threaded dust cap 47. This cap must be removed when air is to be supplied to the tire.

In the form shown in Figure 5 the construction is identical with that seen in Figure 1 except that the two metal to metal joints on the high pressure side of the valve have been replaced by packed joints. The packing is seen at 48 between the preferably flat annular end 49 of the valve stem (rather than tapered or rounded as in Figure 1), and the recess 50 provided at the base of the thread in the cup 30. A similar joint is seen between the end 51 of the cup and the recess 52 in the support, packing being provided at 53. The packing may be of any suitable material, e. g., cotton or asbestos, either oiled or dry.

Figure 2:
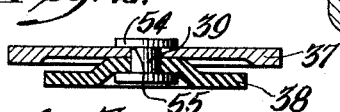
Figure 2 is a section along the line 4—4 of Figure 3, showing the disc valve in detail.
Figure 3:
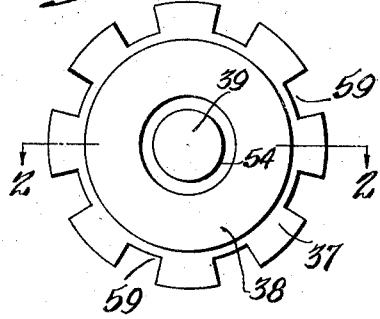
Figure 3 is a bottom plan view of the valve.

From Figures 2 and 3 the valve and valve disc may be more clearly seen. The rivet 39 is shown as having wide flanged faces 54 and 55, annularly ribbed if desired as in the case of 54 so as to make a good union with the rubber of the valve and the metal of the disc and to avoid possibility of leakage.

Figure 4:
Figure 4 is a section generally similar to Figure 2, but showing a somewhat different attachment of a rubber valve to the disc base.

In Figure 4 the valve is provided with a flanged disc-like extension 56 which engages in a recess 57 pressed from the valve disc 37'. For the sake of added security the valve extension is cemented to the disc at 58.

The notching of the disc 37 at 59 to a depth greater than the width of the shoulder 36 in the valve cup 30, seen in Figure 1, permits air to pass freely from the bore 35 to the counterbore 34 and thence through the valve stem into the tube, notwithstanding that the valve disc 37 will be seated upon the shoulder 36.

When air pressure is first applied through the extension 46 of the valve seat support, the valve is forced away from its seat and the valve disc is pushed into engagement with the shoulder 36. Air then passes between the valve seat and the valve into the bore 35. From the bore 35 air passes freely through the ports 59 in the valve disc into the counterbore 34, then through the opening 33 into the valve stem, and thence into the tube.

As soon as the internal pressure is built up to an extent so that it is slightly greater than the external pressure in the tubular extension of the valve seat support, the valve will snap closed and seat firmly against the annular valve seat. When it is desired to add additional air to that already filling the tube, the valve will open as soon as the pressure in the tubular extension is built up to a point when it is slightly greater than that in the valve stem, the bore and the counterbore, and the process of filling will be repeated as described above.

The superiority of my invention from the standpoint of quick filling will be evident from the large size of my valve opening and passages as compared with the very small opening found in the present plunger valve.

When I desire to repair my valve, I may remove the valve cup and seat support from the valve stem, and then separate the parts by unscrewing the support from the valve cup, or I may leave the cup attached to the stem and similarly remove the support. In either event the valve and valve disc may be lifted out.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what

I claim as new and desire to secure by Letters Patent is:—

A valve assembly for the stem of a pneumatic tire including longitudinally perforated coaxial inlet and outlet fittings having interthreading forwardly and rearwardly directed cup portions and a movable valve inside the overlapping interthreading portions of the fittings, the inlet fitting presenting its forward end as a valve seat inside the rearwardly directed cup of the outlet fitting, and said valve comprising a disc in front of and adapted to engage the seat, a mount forward of and carrying the disc, diametrally larger than the disc, having circumferentially spaced peripheral portions loosely engaging the interior of a more rearward portion of the said rearwardly directed cup and having intermediate the said peripheral portions and radially outwardly beyond the disc, recesses toward the disc, a spring compressed between the mount and bottom of the rearwardly directed cup and an inward abutment forwardly of the mount on the interior of the rearwardly directed cup limiting the forward movement of the mount and thereby the forward movement of the valve.

MATT FINGER.